United States Patent [19]
Dutton et al.

[11] Patent Number: 4,957,708
[45] Date of Patent: Sep. 18, 1990

[54] PROCESS AND APPARATUS FOR FORMING POLYMERIC SOLUTIONS

[75] Inventors: James P. Dutton, Vienna, N.J.; Ronald Beech, Zanesville, Ohio

[73] Assignee: Ashland Oil, Inc., Russell, Ky.

[21] Appl. No.: 427,459

[22] Filed: Oct. 26, 1989

Related U.S. Application Data

[63] Continuation of Ser. No. 103,968, Oct. 5, 1987.

[51] Int. Cl.[5] ............................................. G05D 9/00
[52] U.S. Cl. ................................... 422/106; 366/153; 422/131; 422/135; 422/225; 422/232; 422/236; 422/259; 422/261; 422/292
[58] Field of Search ............... 422/131, 135, 224, 225, 422/232, 236, 258, 259, 261, 292; 366/265, 266, 279, 153

[56] References Cited

U.S. PATENT DOCUMENTS 3,729,174  4/1973  Banhsen ............................ 259/7
4,125,574  11/1978  Kastner et al. ..................... 422/135

Primary Examiner—Robert J. Warden
Assistant Examiner—Amalia L. Santiago
Attorney, Agent, or Firm—Louis E. Marn

[57] ABSTRACT

There is disclosed an apparatus for forming hydrophilic polymeric solutions wherein a vessel is provided with a mixing assembly comprised of co-axially and vertically-disposed inner and outer cylindrically-shaped wall members mounted to a bottom wall member wherein the inner wall member defines a mixing chamber and is provided with orifices about a lower portion thereof to provide fluid communication to a solution chamber defined between the wall members and wherein an upper portion of the outer wall member defines a weir to the vessel and wherein an agitator is positioned within the mixing chamber to admixed feed hydrophilic polymer and solvent in a vortex of polymeric solution contained in the mixing chamber and to cause the polymeric solution to overflow the weir into the vessel.

5 Claims, 1 Drawing Sheet

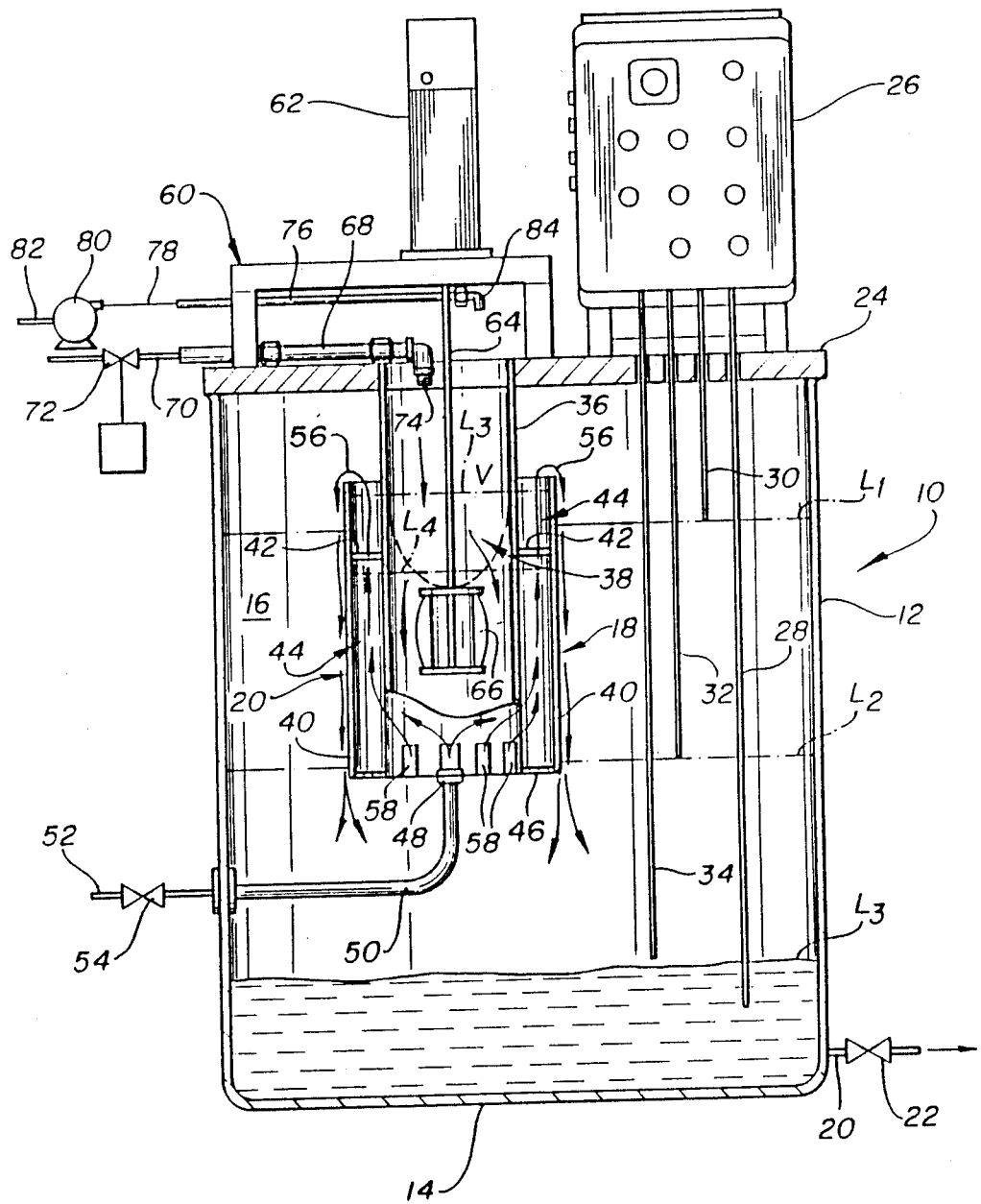

PROCESS AND APPARATUS FOR FORMING POLYMERIC SOLUTIONS

This is a continuation, of application Ser. No. 103,968, filed Oct. 5, 1987.

BACKGROUND OF THE INVENTION (1) Field of the Invention

This invention relates to an improved process and apparatus for forming solutions, and more particularly to an improved process and apparatus for forming a solution of a hydrophilic polymer.

(2) Description of the Prior Art

Certain hydrophilic polymers in solution (in concentrations of up to about 1%) exhibit excellent flocculating properties. Generally, in the preparation of such solutions, for example, by admixing the hydrophilic polymer with water, existing designs for such equipment involved the introduction of the polymer into a flowing stream or to an agitated non-flowing body of water. With certain polymers, e.g. high solids (50–55%), inverted emulsion polymers, the direct introduction of the polymer into the system is troubled by blockage of the polymer feed line at or near the point of injection into the solvent stream or polymer solution. The use of open tanks has a tendency to produce an unacceptable amount of gels (sometimes referred to as "fish-eyes"). Additionally, existing designs have included a mixing vessel in fluid communication with a storage vessel from which are withdrawn process requirements of the polymeric solution.

OBJECTS OF THE INVENTION

An object of the present invention is to provide an improved process and apparatus for preparing polymeric solutions.

Another object of the present invention is to provide an improved process and apparatus for preparing polymeric solutions from hydrophilic polymers.

Yet another object of the present invention is to provide an improved process and apparatus for preparing uniform and gel-free hydrophilic polymeric solutions.

Still another object of the present invention is to provide an improved process and apparatus for preparing uniform and gel-free hydrophilic polymeric solutions at any desired concentration of the polymer.

A further object of the present invention is to provide an improved process and apparatus for preparing uniform and gel-free hydrophilic polymeric solutions at any desired solution feed rates.

A still further object of the present invention is to provide an improved process and apparatus for preparing uniform and gel-free hydrophilic polymeric solutions eliminating additional storage and aging requirements.

SUMMARY OF THE INVENTION

These and other objects of the present invention are achieved in a vessel provided with a mixing assembly comprised of co-axially and vertically-disposed inner and outer cylindrically-shaped wall members mounted to a bottom wall member wherein the inner wall member defines a mixing chamber and is provided with orifices about a lower portion thereof to provide fluid communication to a solution chamber defined between the wall members and wherein an upper end portion of the outer wall member defines a weir to the vessel and wherein an agitator is positioned within the mixing chamber to admixed feed hydrophilic polymer and solvent in a vortex of polymeric solution contained in the mixing chamber and to cause the polymeric solution to overflow the weir into the vessel.

BRIEF DESCRIPTION OF THE DRAWING

A better understanding of the present invention as well as other objects and advantages thereof will become apparent upon consideration of the detailed disclosure thereof, expecially when taken with the accompanying drawing of a schematic cross-section of the mixing assembly of the present invention.

Referring now to the drawing, there is illustrated a vessel 10 formed of a cylindrically-shaped side wall 12 and a bottom 14 and defining a chamber 16 and a mixing assembly of the present invention, generally indicated as 18. A solution outlet line 20 under the control of valve 22 is disposed in a lower portion of the cylindrically-shaped side wall 12. Disposed on the vessel 10 is a platform member 24 for mounting a control panel assembly, generally indicated as 26, having a plurality of process level control electrodes 28, 30, 32 and 34 extending vertically downward into the chamber 16. The process level control electrodes 28, 30, 32 and 34 are connected to the control panel assembly 26 to provide a ground, process stop, process start and process alarm information, respectively. The process level control electrode 30 senses a full level ($L_1$) of polymeric solution wherein the process level control electrode 32 senses a lower level ($L_2$) at which level processing of the polymeric solution should be initiated to fulfill downstream process requirements. The process level control electrode 34 senses a level ($L_3$) of polymeric solution to alert process personnel to an upset condition.

To the platform member 24 there is mounted a cylindrically-shaped wall member 36 extending vertically downwardly into the chamber 16 of the vessel 10 and defining a mixing chamber 38. Concentrically-disposed about and spaced apart from the cylindrically-shaped wall member 36, there is provided a cylindrically-shaped outer wall member 40 mounted to the cylindrically-shaped wall member 36 by radially and horizontally disposed spacer members 42 and defining an outer chamber 44. The lower portion of the cylindrically-shaped outer wall member 40 is enclosed by a bottom wall member 46 having a centrally-disposed fitting 48 for receiving a conduit 50 in fluid flow communication with line 52 under the control of valve 54.

The upper portion of the cylindrically-shaped outer wall member 40 extends upwardly defining an overflow portion or weir 56 at a point above the level ($L_1$) of the polymeric solution in the vessel 10. The lower portion of the cylindrically-shaped inner wall member 36 proximate the bottom wall member 46 is formed with a plurality of vertically-extending slots 58 permitting fluid communication between the mixing chamber 38 and the outer chamber 44, as more fully hereinafter discussed.

Positioned on the platform member 24 is a support bridge, generally indicated as 60. On the support bridge 60, there is mounted a motor 62 having a vertically-disposed shaft 64 extending downwardly into the mixing chamber 38 in co-axial alignment therewith. A lower portion of the shaft 64 opposite the motor 62 is provided with an agitator member 66 positioned within the mixing chamber 38.

A conduit 68 is provided in fluid flow communication with a source of solvent (not shown) by line 70 under the control of a solenoid valve 72. The conduit 68 is provided with an outlet 74 disposed above the mixing chamber 38. A conduit 76 is provided in fluid flow communication by line 78 with the discharge side of a metering pump 80. The suction side of the metering pump 80 is in fluid flow communication by line 82 with a source 73 containing the polymer. The conduit 76 is provided with an outlet 84 also disposed above the mixing chamber 38.

In operation, assuming a solution level ($L_2$) is reached within the vessel 10 at which level the process level control electrode 32 (process start) senses such level condition, appropriate signals are internally generated by the control panel assembly 26 to energize the motor 62 to thereby rotate the vertically-disposed shaft 64 and agitator member 66. At the same time the metering pump 80 is energized and the solenoid valve 72 is opened and remains opened and set for a preselected processing condition as determined by the requirements of the system, i.e. concentration of the polymeric solution.

Prior to sensing any low level condition of polymeric solution in the vessel 10, there is a level ($L_4$) of polymeric solution in the inner and outer chambers 38 and 44 from a preceding mixing or solution operation. Upon energizing the motor 62 and thus the agitator member 66, a vortex; as indicated by the dotted line (V), is formed within the mixing chamber 38. The liquid polymer and solvent in conduits 76 and 68, respectively, are then introduced under controlled rates into the mixing chamber 38 onto the vortex (V) of the polymeric solution whereby intimate mixing of such components is effected by rotation of the agitator member 66. It will be understood that the output of the metering pump 80 and the flow rate of solvent through line 70 is predetermined to the requirements of the concentration of the desired polymeric solution.

As the flow of the liquid polymer and solvent is continued, the level of liquid in the outer chamber 44 rises until a point is reached whereby the liquid flows or spills over the weir 56 into the chamber 16 of the vessel 10. The flow of the liquids into the mixing chamber 38 is continued until a level of liquid ($L_2$) is reached in the chamber 16 of the vessel 10 as sensed by the process level control electrode 30 whereupon appropriate signals are generated to de-energize the metering pump 80 and close the solenoid valve 72 in line 70. Generally, it is desirable to continue mixing of the solution in the mixing chamber 38 for a predetermined time period, e.g. 1-2 minutes prior to de-energizing the motor 62.

During the time period in which the liquid rises from the liquid level ($L_2$) to the liquid level ($L_1$), the agitator member 66 continuously effects vigorous mixing of the polymer and solvent into the polymeric solution in the mixing chamber 38. Generally, the volume of the vessel 10 is chosen with respect to process requirements to provide an aging period for the polymeric solution, i.e. uncoiling the hydrophilic polymer, and thereby to provide an aged polymeric solution for process requirements withdrawn by conduit 20, although it is understood that not all hydrophilic polymers will undergo an uncoiling process.

EXAMPLE OF THE INVENTION

The following example is illustrative of conditions for the process of the invention and it is to be understood that the scope of the invention is not to be limited thereby.

Typically, a vessel having a capacity of about 300 gallons is provided with the mixing assembly comprised of the concentrically-mounted inner and outer wall members enclosed by the bottom wall member with slots formed in the lower portion of the inner wall member. A metering pump having a capacity of 0.01 to 0.1 gpm is provided in line 82. Polyacrylamide/55% inverted emulsion product (a typical hydrophilic polymer) is introduced into the mixing chamber 38 at a rate of 0.04 gpm and with water being introduced by the conduit 76 at a rate of 7.96 gpm to form a polymeric solution of a concentration of 0.5%. At this rate of introduction, 8.0 gallons per minute of the polymeric solution are formed. With the process level control electrodes 30 and 32 set at predetermined differential levels of 90 gallons, 11.25 minutes of operation time are required to generate the differential solution requirements to raise the liquid in vessel 10 from the level ($L_2$) to the level ($L_1$). The motor 62 is preferably energized for about 60 seconds following the termination of liquid flow into the initial mixing chamber 38 to insure complete mixing.

While the invention has been described in connection with an embodiment thereof, it will be understood that many modifications will be apparent to those of ordinary skill in the art; and that this application is intended to cover adaptations or variations thereof. Therefore, it is manifestly intended that this invention be only limited by the claims and the equivalents thereof.

What is claimed is:

1. An apparatus for forming a polymeric solution including a vessel defining a storage chamber therein and a mixing assembly, said mixing assembly comprising:
   (a) a cylindrically-shaped inner wall member extending downwardly into said vessel, a bottom portion of said inner wall member having slots defining orifices therein;
   (b) a bottom member mounted to a lower portion of said inner wall member and defining a mixing chamber therein;
   (c) a cylindrically-shaped outer wall member co-axially disposed about said inner wall member and mounted to said bottom member and defining a solution chamber, said outer wall member extending upwardly from said bottom member defining weir means;
   (d) a source containing polymer, conduit means for introducing a polymer and conduit means for introducing solvent into said mixing chamber; and
   (e) agitator means including an agitator member disposed in said mixing chamber at a point intermediate said bottom member and said weir means of said outer wall member for forming a vortex of said polymeric solution into which said polymer and said solvent are introduced for admixing and for causing a resulting polymeric solution to pass through said orifices in said inner wall member, through said solution chamber and overflow said weir means of said outer wall member into said storage chamber, said agitator means forming said vortex for avoiding formation of fish eyes of said polymer.

2. The apparatus for forming a polymeric solution as defined in claim 1 and additionally comprising means for sensing an upper level of polymeric solution in said vessel, said upper level being at a point below said upper weir portion of said outer wall member.

3. The apparatus for forming a polymeric solution as defined in claim 2 and additionally comprising means for sensing a level of polymeric solution below said upper level of said polymeric solution in said vessel and to activate said agitator means and open valve means associated with said polymer conduit means.

4. The apparatus for forming a polymeric solution as defined in claim 3 wherein said sensing means to activate said agitator means and open said valve means is disposed at a point to establish a storage level of polymeric solution in said vessel to satisfy downstream process requirements for said polymeric solution.

5. The apparatus for forming a polymeric solution as defined in claim 1 wherein said slots are radially disposed about said inner wall member proximate said bottom member.

* * * * *